United States Patent [19]

Vassiliadis et al.

[11] Patent Number: 4,924,423
[45] Date of Patent: May 8, 1990

[54] HIGH SPEED PARITY PREDICTION FOR BINARY ADDERS USING IRREGULAR GROUPING SCHEME

[75] Inventors: Stamatis Vassiliadis, Vestal; Eric M. Schwarz, Endicott, both of N.Y.

[73] Assignee: International Business Machines Corporation, Armonk, N.Y.

[21] Appl. No.: 185,581

[22] Filed: Apr. 25, 1988

[51] Int. Cl.$^5$ .............................................. G06F 11/10
[52] U.S. Cl. .................... 364/738; 371/49.4
[58] Field of Search ............... 371/49.4; 364/737, 738, 364/741

[56] References Cited

U.S. PATENT DOCUMENTS

| | | | |
|---|---|---|---|
| 3,911,261 | 10/1975 | Taylor | 235/153 |
| 3,925,647 | 12/1975 | Louie | 235/153 |
| 3,986,015 | 10/1976 | Gooding et al. | 235/153 |
| 4,079,457 | 3/1978 | Miller | 364/738 |
| 4,224,680 | 9/1980 | Miura | 364/738 |
| 4,737,926 | 4/1988 | Vo et al. | 364/787 |

OTHER PUBLICATIONS

IBM Technical Disclosure Bulletin, vol. 23, No. 12, May 1981, Parity Predict of a Sum—P. Kalandra and A. Weinberger.
IBM Technical Disclosure Bulletin, vol. 22, No. 4, Sep. 1979, Parity Prediction for Fast Three-Input Adder, K. E. Olin and A. Weinberger.
IBM Technical Disclosure Bulletin, vol. 30, No. 3, Aug. 1987, Minimized Parity Predict Circuit for Incrementation.

*Primary Examiner*—Jerry Smith
*Assistant Examiner*—David M. Huntley
*Attorney, Agent, or Firm*—Baker, Maxham, Jester & Meador

[57] ABSTRACT

Parity for every byte of the sum produced by addition of two operands is predicted based upon segmentation of each sum byte into three irregular groups of adjacent bits. Parity is generated for each group and the group parities are combined to form the parity of the sum byte. Adder technology is used to generate the group parities from operands and carry bits, which leads to Boolean minterm circuitry employing a minimum of exclusive-OR gates.

4 Claims, 8 Drawing Sheets

HIGH SPEED PARITY PREDICTION FOR BINARY ADDERS USING IRREGULAR GROUPING SCHEME

BACKGROUND OF THE INVENTION

1. Field of the Invention

This invention relates generally to the area of error detection for digital computer systems and more specifically to parity prediction logic for high-speed binary adders.

2. DESCRIPTION OF THE PRIOR ART

A binary adder is a vital component of electronic digital computer systems. The speed and reliability of the binary adder are, therefore, major concerns in computer system design. It is well known that a carry-look-ahead adder generates the result of an operation on two operands faster than a ripple carry adder. It is also known that a carry-look-ahead adder can be implemented in many different ways. This invention is not concerned with design of a high-speed binary adder, but rather relates to the design of checking logic for error detection in a high speed adder.

In the past, computers were used largely in an off-time, batch-processing mode and the consequences of undetected hardware malfunctions were relatively minor. Today, digital computers, even main-frame computers, are utilized in on-line information processing, data entry and retrieval, and real-time control of processes. Incorrect computer operation in any of these applications must be detected as soon as possible. At the same time, the increased size and complexity of digital computers have made it more and more difficult to ensure correct machine operation.

In modern computer systems, operational reliability is supported by built-in error detection. A commonly used method of error detection is parity checking. Conventionally, in a parity checking procedure, a "parity" bit is generated in response to the number of "ones" in an arbitrary group of bits. Typically, for a byte, comprising eight bits of data, the parity bit will take on a digital value (1 or 0) which will make the sum of ones in the combined group of nine bits odd, if odd parity applies, or even, if even parity.

In modern computer architecture, data is transferred or exchanged between architectural units in a standard format. For example, data is transferred in the form of sequences in multi-byte "words" in many contemporary architectures. It is the case that a parity bit accompanies each byte being transferred to that transfer of a four-byte word involves thirty-six bits.

When words are operated upon by computer elements, as, for example, in an adder, the parity bits are separated and separately treated. When two words are combined in an adder to produce a result word, parity bits must be generated for each byte of the result. Formerly, parity bits for the result word were generated when the word was available from the adder. In this case, the parity bits were generated by operating on the result. It is now standard practice to increase the speed of conventional adder operations by "predicting" parity bits for the results in a parity predict operation performed concurrently with the add operation. In such schemes, predicted parity is generated and then compared to the actual parity of the result word. If disparity is detected, an error signal generated by the comparison causes the adder to repeat its operation. If a second error is detected, it is assumed that the adder has malfunctioned.

The operation of an adder generally involves two multi-bit operands. In combining the operands to produce a result, the operand bits are transformed as well as transferred by the binary adder and the resultant parity bits of the result are difficult to predict. To solve this particular problem, a commonly used technique for adder error checking is to employ two identical adders in the system and to compare their results bit-by-bit to check that the operation is error free. Another technique is to have three identical adders in the system and "take a majority vote" among the three results to identify an adder that has erred.

Each of the above-mentioned techniques has disadvantages. First, it is expensive to duplicate (and even more so to triplicate) the same adder logic. Second, a parity bit cannot be preserved throughout the operation of the adder system. This is undesirable when all other areas of the same system have parity bits carried throughout.

A preferred approach is to construct parity predicting logic to predict the correct parity for the output of the adder. The predicted parity could then be compared to the actual parity of the sum. If unequal, an error signal is generated which causes the adder to repeat the addition. If another error is detected, it is assumed that the adder has failed.

Parity prediction schemes are shown in Louie, U.S. Pat. No. 3,925,647 and Kalandra et al, IBM TDB Vol. 23, No. 12 (5/81). These schemes include parity prediction circuits which are very complex and may cause more delay than the adder itself. Elimination of delay is important, particularly in pipelined processing systems. The parity prediction delays cause the system designer to be faced with a trade-off: allow the system to operate at the speed of the adder and provide for means to unravel the system errors caused by errors in the adder, or slow the system to allow for the delays of the parity prediction circuit.

Another parity prediction scheme is shown in Taylor, U.S. Pat. No. 3,911,261. However, the scheme of Taylor only provides a "best guess" predicted parity. The increased error and delays caused by inaccurate "guesses" are unacceptable in modern computing systems.

SUMMARY OF THE INVENTION

The described embodiments of the present invention include a parity prediction circuit for a two operand adder which operates at least as quickly as the adder itself. This is accomplished by segmenting the bytes of the sum resulting from adding the operands. Each sum byte is segmented into at least three predetermined groups of consecutive bits. Preferably, the first group includes the two most significant bits of the sum byte, the second group includes the next three most significant bits, and the third group, the three least significant bits of the sum byte. Partial parity bits are generated for each byte portion, and exclusive-ORing the partial parity bits to obtain a parity bit for the byte. Parity is predicted from the operands and one carry bit provided, with the operands, to the adder. This avoids the use of externally-generated parity input bits and internal carry bits.

In addition, the described embodiments accomplish parity prediction using a minimum of logic gates, particularly exclusive-or gates.

DETAILED DESCRIPTION OF THE PREFERRED EMBODIMENT

Figure 1:
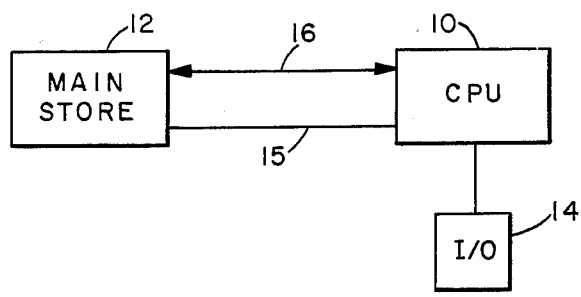
FIG. 1 is a schematic diagram of a computing system.

FIG. 1 is a schematic diagram showing a typical computing system upon which the invention can be practiced. The apparatus of this invention can be included in a computing system of the type including one or more CPU's 10, each having a main store 12 and I/O resources 14. Such a system is described in Amdahl et al, U.S. Pat. No. 3,400,371 entitled "Data Processing System". The Amdahl system includes, as a resource, all of the facilities of the computing system and an operating system running thereon, which are required for control and operation of CPU facilities including the apparatus of this invention. For operation of the invention, the CPU 10 provides address data on an address bus 15, which stimulates the provision of data, including operands, to the CPU 10 by way of a data bus 16.

Figure 2:
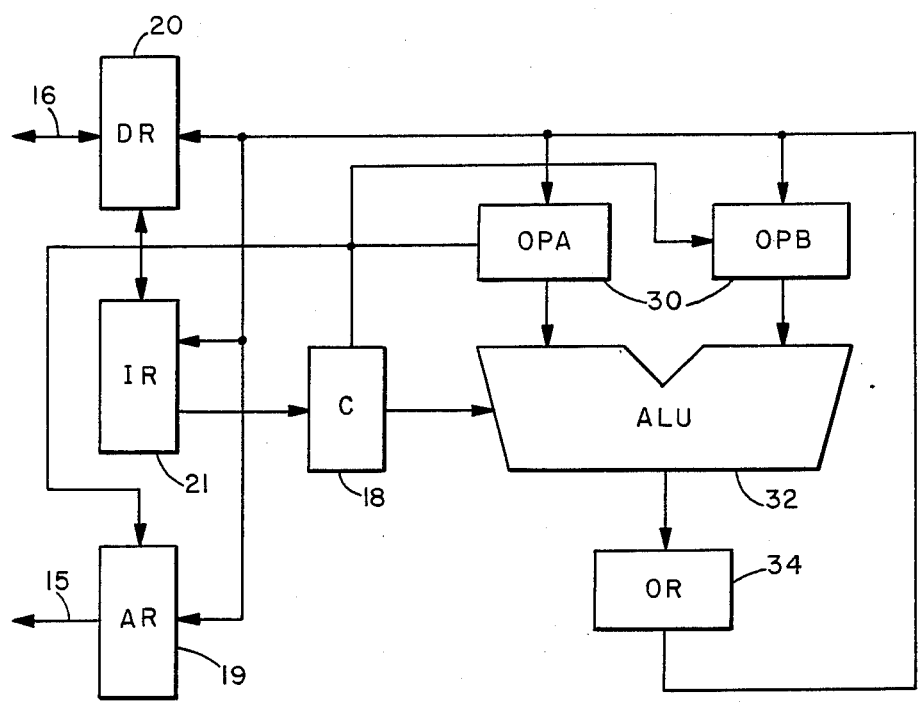
FIG. 2 is a schematic diagram of the central processing unit 10 (CPU) of the computing system of FIG. 1.

FIG. 2 is a schematic diagram illustrating, in greater detail, certain features of the CPU 10 which aid in the operation of the apparatus of the invention. A control unit 18 provides address information through an address register 19 to the address bus 15. In response to the data provided on the address bus 15, program instructions are loaded through the data bus 16 and the data register 20 into instruction register 21. The control unit 18 then decodes the instructions loaded into instruction register 21 and generates synchronization and control signals which guide the operations of the CPU. In response to the signals generated by the control unit 18, operands are retrieved from memory 12 (FIG. 1), provided to a pair of operand registers 30, and combined by an arithmetic logic unit 32 (ALU), which provides a result to an outer register 34. The result may be stored in memory or provided to another internal register of the CPU.

Figure 3:
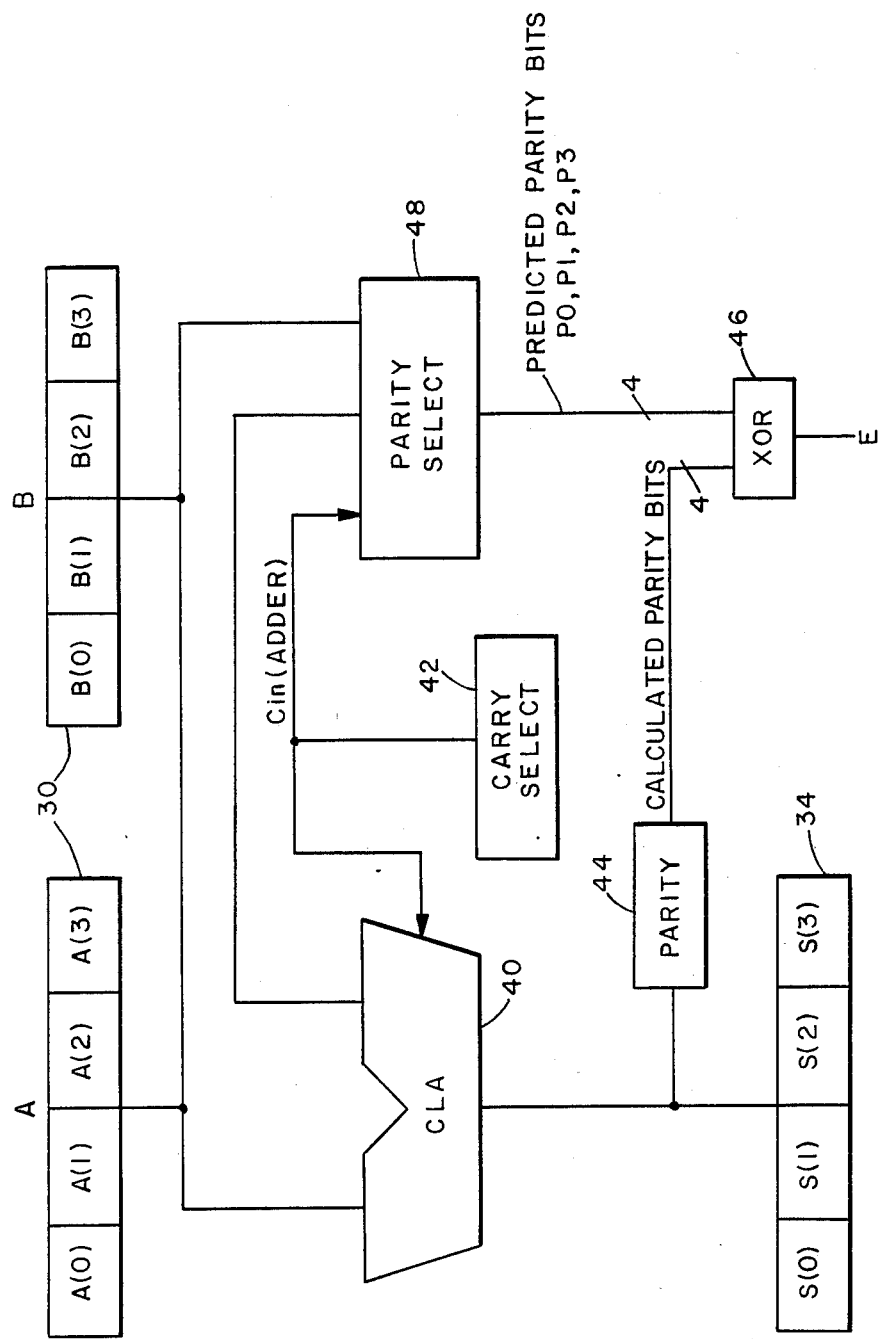
FIG. 3 is a logic diagram showing the operation of a parity prediction circuit according to the present invention in conjunction with a two operand adder.

FIG. 3 is a schematic diagram showing, in greater detail, the ALU 32 of FIG. 2 in a structure including the apparatus of the invention. In FIG. 3, the ALU includes a conventional carry-look-ahead (CLA) adder 40 which receives two operands, operand A and operand B, from the operand registers 30.

Each operand reflects current industry conventions; that is, each comprise 32 data bits grouped into four 8-bit bytes. The bytes of operand A are denoted as A(0)-A(3), while those of operand B are denoted as B(0)-B(3). In each case, byte significance decreases with increasing byte position magnitude. Thus, byte A(i) is more significant than byte A(i+1). The bit notation for each operand follows convention, with the bit of an operand denoted as $a_i$ or $b_i$, where i is a positive integer greater than or equal to zero and less than or equal to 31. As with byte significance, the significance of operand bit i is greater than the significance of operand bit i+1.

The CLA 40 combines the operands using known procedures with a carry-in signal, Cin(adder), provided by a carry select circuit 42. A thorough explanation of the operation of carry-look-ahead adders is found in the reference by Langdon et al, entitled "Concurrent Error Detection for Group Look-Ahead Binary Adders", IBM Technical Report, TR 01.1200, Aug. 26, 1969. The carry select circuit 42 is conventional in all respects and is fully described in U.S. Pat. No. 3,986,015 of Gooding et al, which is incorporated herein by reference. The signal Cin(adder) is binary, with one state of the signal causing a 1 to be carried into the lowest order bit stage in the CLA 40. Conversely, the opposite state of Cin(adder) causes a 0 to be carried into the stage. The CLA 40 combines operands A and B with the Cin(adder) signal to produce a resulting 32-bit sum, S. The sum S includes 32 data bits, s0-s31, partitioned into four 8-bit sum bytes S(0)-S(3). The significance convention for the bits and the bytes of the sum S conforms to that applying to the operands.

It is asserted that the CLA 40 is a Langdon-type adder of the class described in the Langdon et al reference, and that it operates in association with a parity circuit 44. The parity circuit 44 calculates a parity bit for each of the sum bytes S(0)-S(3) in response to the sum bits, s0-s31. The parity circuit 44 is conventional in all respects, and reflects technology explained in detail in the incorporated Gooding et al patent. The output of the parity circuit 44 is provided to a conventional exclusive-OR (XOR) circuit 46. Also provided to the XOR circuit 46 is the output of the apparatus of the invention, a parity predict apparatus which surpasses the state of the art of conventional parity prediction for adder operations by structural features which avoid limitations imposed by the prior art. The parity predict circuit of the invention is indicated by reference numeral 48 in FIG. 3.

The parity predict circuit 48 receives both of the operands provided to the adder 40, as well as the Cin(adder) signal. The parity predict circuit 48 of the invention operates as described below to predict the parity and to provide appropriately-conditioned parity bits for each byte of the sum S. The output of the parity predict circuit 48 of the invention is provided as the other input to the XOR circuit 46. The output of the parity predict circuit of the invention is compared by the XOR circuit 46 against the conventionally-obtained parity generated by the circuit 44. The XOR circuit 46 provides an error signal E conditioned to reflect whether or not the outputs of the circuits 44 and 48 are identical.

PRIOR ART PARITY PREDICTION

For the description following, CLA notations and Boolean notations and equivalencies are used extensively. These notations and equivalencies, which are established in the art, are listed in Appendix A. Further, in the following description, "carries" are the quantities generated by combining operand segments of equal order and transferred to the combination of the next higher significance segments. For example, the Cin-(adder) is transferred to the adder to be included in the addition of the lowest magnitude bytes of operands A and B. The carry-in to the combination of the next higher operand bytes (A(2) and B(2)) is the carry-out of the sum of A(3), B(3) and Cin(adder).

Prior art parity prediction for a carry-look-ahead adder is well described in the Langdon et al reference at pages 12-14. In the Langdon et al reference, the traditional formulation of parity for addition is given by:

$$Ps = Pa \lor Pb \lor Pc \tag{1}$$

where Ps is the parity of the sum, Pa and Pb are respectively the parity of operands A and B, and Pc is the parity of the carries. Direct implementation of this formula normally results in significant delay of parity prediction with respect to production of an adder result. In this regard, once the carries into a bit are calculated, then normally only one stage of the delay is needed to produce the sum. However, to calculate Pc, the parity of the carries, an XOR tree is needed after the carries into each bit are calculated, thus, the parity is available considerably later than the result of the operation.

In order to reduce the number of execution cycles required for adder operation, it is of interest to predict the parity of the sum so as to have the parity of the operation and the result available at the same time.

In the Langdon et al reference, implementation of the formula for parity prediction is based upon an artifact of early era carry-look-ahead architecture which persist to this day. Because of fan-in limitations in the then-available circuit technology, carry-look-ahead reflected division of each operand and sum byte into two 4-bit groups. The sum and carry-out of each 4-bit group depended upon generation of carry-look-ahead from the adjacent 4-bit group of lower significance. The traditional formulation for parity predict schemes found in the Langdon et al reference, reflects this arbitrary segmentation in a scheme for parity prediction which follows the following steps:

1. Separate each sum and operand byte into two equal 4-bit groups.
2. Create the carry into each group based upon the adjacent group of lower significance.
3. Create the half-sum H(i) internal to the group.
4. Create the transmit signals, T, and generate signals, G, internal to the group.
5. Use the parity formula given above for a group to calculate the parity over that group according to:

$$Ps = Pa \lor Pb \lor G0 \lor G1 \lor G2 \lor (G0H1H2' + G1H2) \\ \lor Cin(H0' + H1H2') \tag{2a}$$

6. Or alternatively, use the better parity formula:

$$Ps = T0 \lor T1 \lor T2 \lor H3 \lor (G0H1H2' + G1H2) \lor \\ (Cin\ H0' + Cin\ H1\ H2') \tag{2b}$$

In both equations (2a) and (2b), in order to comply with 8-bit byte conventions, the formulations have to be modified, since each assumes a 4-bit grouping boundary. In the first case, the result is as follows:

$$(3)$$

$$\begin{aligned}Ps =\ & Pa1 \lor Pb1 \lor G0 \lor G1 \lor G2 \lor (G0H1H2' + G1H2) \lor \\ & C4(H0' + H1H2') \lor Pa2 \lor Pb2 \lor G4 \lor G5 \lor G6 \lor \\ & (G4H5H6' + G5H6) \lor Cin(H4' + H5H6')\end{aligned}$$

where Pa1, Pb1 is parity over the first four bits of a sum byte and Pa2, Pb2 is parity over the last four bits of the byte. In equation (3), C4 is the carry into the first four most significant bits of the byte. It is noted that equation (3) requires 13 XOR gates for the byte, as well as parity of the inputs and the carry into the third bit. For the same byte, equation (2b) leads to the following for prediction of parity of the sum byte.

$$\begin{aligned}Ps =\ & T0 \lor T1 \lor T2 \lor H3 \lor (G0H1H2' + G1H2) \lor \\ & (C4\ H0' + C4\ H1\ H2') \lor T4 \lor T5 \lor T6 \lor \\ & H7 \lor (G4H5H6' + G5H6) \lor (Cin\ H4' + Cin\ H5\ H6')\end{aligned} \tag{4}$$

In equation (4), the XOR gate requirement drops to 11.

THE INVENTION

Repeating equation (1), it is known that the parity for addition obeys the following law:

$$Ps = Pa \lor Pb \lor Pc \tag{2.1}$$

In adopting the convention of 1 bit parity per data byte, equation (2.1) has to be implemented for each byte of the sum. In doing this, a grouping of the sum byte is imposed, and this invention is based on a 2-3-3 grouping as follows:

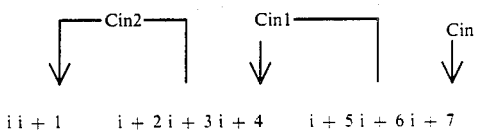

In this diagram, the bits of a sum byte, S(j), are indicated, in order of decreasing magnitude by $i-i+7$. This notation is general for all of the sum bytes. It is understood that operand bits $ai-ai+7$ and $bi-bi+7$ are the operand bits which correspond in magnitude with the sum bits $i-i+7$, and are contained in operand bytes A(j) and B(j). Further, Cin is the carry-out of the sum byte S(j+1), or Cin(adder) if j=3. Cin1 is the carry into bit group $i+2$ through $i+4$, and Cin2 is the carry into bit group i through $i+1$.

The parity for an eight-bit sum byte, Sj, is calculated by XORing the bits of that word. By grouping positions of the sum bits of the byte as discussed above:

$$Ps0\text{-}7 = Ps0\text{-}1 \lor Ps2\text{-}4 \lor Ps5\text{-}7 \tag{2.2}$$

where s0 signifies the most, and s7, the least significant bit of the byte. Further reducing equation (2.2) yields:

$$Ps5\text{-}7 = Pa5\text{-}7 \lor Pb5\text{-}7 \lor Pc5\text{-}7$$

$$Ps2\text{-}4 = Pa2\text{-}4 \lor Pb2\text{-}4 \lor Pc2\text{-}4$$

$$Ps0\text{-}1 = Pa0\text{-}1 \lor Pb0\text{-}1 \lor Pc0\text{-}1$$

In any group of 3 bits, four carries are computed by:
Cin=carry into the group $$C_i = G_i + T_i C_{in}$$

$$C_{i-1} = G_{i-1} + (T_{i-1})G_i + (T_{i-1})T_i C_{in}$$

$$C_{i-2} = \text{carry out of the group}$$

The carries in group 5 to 7 are equal to
Cin = previous carry $$C7 = G7 + T7 C_{in}$$

$$C6 = G6 + T6 G7 + T6 T7 C_{in}$$

$$C5 = C_{out}$$

thus,
$$Pc5\text{-}7 = C_{in} \vee C7 \vee C6$$
$$Pc5\text{-}7 = C_{in} \vee (G7 + T7 C_{in}) \vee (G6 + T6 G7 + T6 T7 C_{in}) \quad (3.2)$$

Using equivalence 1.1, 1.2 and 1.6, $$G7 + T7 C_{in} + G7 \vee T7 C_{in} \vee G7 T7 C_{in}$$
$$G7 + T7 C_{in} = G7 \vee T7 C_{in} (1 \vee G7)$$
$$G7 + T7 C_{in} = G7 \vee H7 C_{in} \quad (3.3)$$

By the same method, the final term in equation (3.2) reduces.
$$G6 + T6G7 + T6T7C_{in} = G6 \vee T6G7 \vee G6T6G7 \vee T6T7C_{in} \vee G6T6T7C_{in} \vee T6T7G7C_{in} \vee T6T7G6G7C_{in} \quad (3.4)$$

Let
$$x = T6G7 \vee G6T6G7 = T6G7 (1 \vee G6) = T6G7G6' = H6G7$$
$$y = T6T7C_{in}(1 \vee G6) = H6TG7C_{in}$$
$$z = T6T7G7C_{in}(1 \vee G6) = H6TG7C_{in}$$

Then, $G6 + T6G7 + T6T7C_{in} = G6 \vee x \vee y \vee z$
$$= G6 \vee H6G7 \vee H6T7C_{in} \vee H6T7G7C_{in}$$
$$= G6 \vee H6G7 \vee H6T7C_{in}(1 \vee G7) =>$$
$$G6 + T6G7 + T6T7C_{in} = G6 \vee H6G7 \vee H6H7C_{in} \quad (3.5)$$

The substitution of equations (3.3) and (3.5) into equation (3.2) results in:

$$Pc5\text{-}7 = C_{in} \vee (G7 \vee H7C_{in}) \vee (G6 \vee H6G7 \vee H6H7C_{in})$$
$$= G6 \vee G7 \vee H6G7 \vee C_{in}(1 \vee H7 \vee H6H7)$$
$$= G6 \vee G7 \vee H6G7 \vee C_{in}(1 \vee H7(1 \vee H6))$$
$$= G6 \vee G7 \vee H6G7 \vee C_{in}(1 \vee H7H6') =>$$
$$Pc5\text{-}7 = G6 \vee G7 \vee H6G7 \vee C_{in}(H7' + H6) \quad (3.6)$$

And with a similar derivation, $$Pc2\text{-}4 = G3 \vee G4 \vee H3G4 \vee C_{in}1(H4' + H3) \quad (3.7)$$

Pc0-1 is a group of two and the carries for this group are:
Cin2 = carry in $$C1 = G1 + T1 C_{in2}$$

C0 = carry out

A simplified expression for the parity of the carries of the group of bits 0 and 1 is derived below.

$$Pc0\text{-}1 = C_{in2} \vee C1$$
$$= C_{in2} \vee (G1 + T1C_{in2})$$
$$= C_{in2} \vee G1 \vee T1C_{in2} \vee G1T1C_{in2}$$
$$= C_{in2} \vee G1 \vee T1C_{in2}(1 \vee G1)$$
$$= C_{in2} \vee G1 \vee H1C_{in2}$$
$$= G1 \vee C_{in2}(1 \vee H1) =>$$
$$Pc0\text{-}1 = G1 \vee H1'C_{in2} \quad (3.8)$$

The predicted parity of the carries of the groups within the byte is summarized in the following three equations:
$$Pc5\text{-}7 = G6 \vee G7 \vee H6G7 \vee C_{in}(H7' + H6) \quad (3.6)$$

$$Pc2\text{-}4 = G3 \vee G4 \vee H3G4 \vee C_{in}1(H4' + H3) \quad (3.7)$$

$$Pc0\text{-}1 = G1 \vee H1'C_{in2} \quad (3.8)$$

PARITY OF THE GROUPS

Using the equations for parity predict of the carries, the parity of the three sum byte groups can now be derived.

For the group of bits 5, 6, and 7, Pa and Pb are equal to:

$$Pa5\text{-}7 = a5 \vee a6 \vee a7$$

$$Pb5\text{-}7 = b5 \vee b6 \vee b7$$

Thus, the parity of the sum of bits 5-7 is:

$$Ps5\text{-}7 = a5 \vee a6 \vee a7 \vee b5 \vee b6 \vee b7 \vee G6 \vee G7 \vee H6G7 \vee C_{in}(H7' + H6)$$

But, $a6 \vee b6 \vee G6 = a6 \vee b6 \vee a6b6 = a6 + b6 = T6$, $$a7 \vee b7 \vee G7 = T7$$

and $a5 \vee b5 = H5$;

thus, $$Ps5\text{-}7 = T6 \vee T7 \vee H5 \vee H6G7 \vee C_{in}(H7' + H6) \quad (4.1)$$

In the same manner, the other group parity of the sums are derived. The following is the result.

$$Ps2\text{-}4 = T3 \vee T4 \vee H2 \vee H3G4 \vee C_{in}1(H4' + H3) \quad (4.2)$$

$$Ps0\text{-}1 = T1 \vee H0 \vee H1'C_{in}2 \quad (4.3)$$

Equation (4.1) implies the following transformation.

$$Ps5\text{-}7 = T6 \vee T7 \vee H5 \vee H6G7 \vee (H7' + H6)C_{in}$$
$$= T6 \vee T7 (C_{in} + C_{in}') \vee H5 \vee H6G7 \vee (H7' + H6)C_{in}$$
$$= T6 \vee T7C_{in} \vee T7C_{in}' \vee H5 \vee H6G7 \vee (H7' + H6)C_{in}$$

But,

-continued $$T7Cin \lor Cin(H7' + H6) = Cin(T7 \lor (H7' + H6))$$
$$= Cin(T7'(H7' + H6) + T7H7H6')$$
$$= Cin(T7' + T7'H6 + T7H7H6')$$
$$= Cin(T7' + T7H7H6')$$
$$= Cin(T7' + T7T7G7'H6)$$
$$= Cin(T7' + T7G7'H6)$$
$$= Cin(T7' + T7G7'H6')$$
$$= Cin(T7' + T7'G7'H6' + T7G7'H6')$$
$$= Cin(T7' + G7'H6')$$

Thus,
$$Ps5\text{-}7 = H5 \lor T6 \lor H6G7 \lor T7Cin' \lor Cin(T7' + G7'H6')$$
And, given that
$$T7Cin' \lor Cin(T7' + G7'H6) = Cin(T7' + G7'H6') + T7Cin'$$
then,
$$Ps5\text{-}7 = H5 \lor T6 \lor H6G7 \lor ((T7' + G7'H6')Cin + T7Cin')$$
But, $T6 \lor H6G7 = G6 + T6G7'$, thus,
$$Ps5\text{-}7 = H5 \lor (G6 + T6G7') \lor ((T7' + G7'H6')Cin + T7Cin') \quad (4.4)$$

The parity of the sum of bits 5 to 7 in equation (4.4) has only two exclusive-ORs, and a similar expression for bits 2 to 4 can be derived in the same manner.

$$Ps2\text{-}4 = H2 \lor (G3 + T3G4') \lor ((T4' + G4'H3')Cin1 + T4Cin1') \quad (4.5)$$

The parity of the sum for sum bits 0 and 1 is reduced in a similar manner.

$$Ps0\text{-}1 = H0 \lor T1Cin2 \lor T1Cin2' \lor H1' \, Cin2$$
$$= H0 \lor T1Cin2 \lor T1Cin2' \lor (T1' + G1)Cin2$$
$$= H0 \lor T1Cin2' \lor Cin2(T1 \lor (T1' + G1))$$
$$= H0 \lor T1Cin2' \lor Cin2(T1' (T1' + G1) + T1(T1G1'))$$
$$= H0 \lor T1Cin2' \lor Cin2(T1' + T1G1')$$
$$= H0 \lor T1Cin2' \lor Cin2(T1' + G1')$$
$$= H0 \lor (T1Cin2'(Cin2' + T1G1) + Cin2(T1' + G1'(T1' + Cin2)))$$
$$= H0 \lor (T1Cin2' + Cin2(T1' + G1'))$$
$$Ps0\text{-}1 = H0 \lor (T1Cin2' + G1'Cin2) \quad (4.6)$$

Thus, the parity of the sum for the three groups within the byte have been reduced to the following three equations:

$$Ps5\text{-}7 = H5 \lor (G6 + T6G7') \lor ((T7' + G7'H6')Cin + T7Cin) \quad (4.4)$$

$$Ps2\text{-}4 = H2 \lor (G3 + T3G4') \lor ((T4' + G4'H3')Cin1 + T4Cin1') \quad (4.5)$$

$$Ps0\text{-}1 = H0 \lor (T1Cin2' + G1'Cin2) \quad (4.6)$$

These equations ((4.4)–(4.6)) describe a first method of parity prediction for the respective groups of a sum byte resulting from the 2-3-3 grouping of the bits.

A second method of the parity prediction for the byte groups can be derived from equations (4.1) to (4.3). This reduction uses only positive carry-in terms, which might be the case in some implementations. The following is the reduction.

$$Ps5\text{-}7 = T6 \lor T7 \lor H5 \lor H6G7 \lor Cin(H7' - H6) \quad (4.1)$$
$$= T7 \lor H5 \lor Cin(H7' + H6) \lor T6 \lor T6G6'G7$$
$$= T7 \lor H5 \lor Cin(H7' + H6) \lor T6(1 \lor G6'G7)$$
$$= T7 \lor H5 \lor Cin(H7' + H6) \lor (G6 + T6G7') =>$$
$$Ps5\text{-}7 = H5 \lor T7 \lor (G6 + T6G7') \lor Cin(H7' + G6) \quad (4.7)$$

Therefore,
$$Ps2\text{-}4 = H2 \lor T4 \lor (G3 + T3G4') \lor Cin1(H4' + H3) \quad (4.8)$$

The equations for this second form of reduction are summarized below:

$$Ps5\text{-}7 = H5 \lor T7 \lor (G6 + T6G7') \lor Cin(H7' + H6) \quad (4.7)$$

$$Ps2\text{-}4 = H2 \lor T4 \lor (G3 + T3G4') \lor Cin1(H4' + H3) \quad (4.8)$$

$$Ps0\text{-}1 = T1 \lor H0 \lor H1'Cin2 \quad (4.3)$$

Two methods for the parity of the sum of the groups have been derived; the first form is equations (4.4), (4.5) and (4.6), and the second form is equations (4.7), (4.8) and (4.3). The next step in the derivation is to use these equations to determine the parity of a byte of the sum.

PARITY OF THE BYTE

The parity of a byte of the sum is dependent upon the carry-in terms. The carry-in terms for the grouping chosen are shown below.

$Cin$ = carry into the byte $$Cin1 = G5\text{-}7 + T5\text{-}7Cin$$

$$Cin2 = G2\text{-}7 + T2\text{-}7Cin$$

Thus, the parity of a byte is dependent upon the Cin and no carry internal to the byte. The two methods derived in the last section are summarized below with this substitution.

Method 1

$$Ps5\text{-}7 = H5 \lor (G6 + T6G7') \lor ((T7' + G7'H6')Cin + T7Cin') \quad (5.1)$$

$$Ps2\text{-}4 = H2 \lor (G3 + T3G4') \lor ((T4' + G4'H3')(G5\text{-}7 + T5\text{-}7Cin) + T4(G2\text{-}7 + T5\text{-}7Cin)') \quad (5.2)$$

$$Ps0\text{-}1 = H0 \lor T1(G2\text{-}7 + T2\text{-}7Cin)' + G1'(G2\text{-}7 + T2\text{-}7Cin)) \quad (5.3)$$

Method 2

$$Ps5\text{-}7 = H5 \lor (G6 + T6g7') \lor Cin(H7' + H6) \quad (5.4)$$

$$Ps2\text{-}4 = H2 \lor T4 \lor (G3 + T3G4') \lor ((G5\text{-}7 + T5\text{-}7Cin)(H4' + H3)) \quad (5.5)$$

$$Ps0\text{-}1 = T1 \lor H0 \lor (G2\text{-}7 + T2\text{-}7Cin)H1' \quad (5.6)$$

In either method, the parity of the byte of a sum is found by exclusive-ORing the three equations together. In addition, it can be easily verified that the first method will require 7 exclusive-OR gates (XORs) for its realization.

In implementing these equations, the Cin for each byte is predicted, since Cin may take several stages to calculate. Carry-in circuitry is well understood, and is described, for example, by equations (3)–(6) of the Langdon et al reference. Thus, parallel hardware can be used to find the parity for Cin equal to zero and Cin equal to one. This is done, for the implementation of Method 1, as is shown below:

For Cin=1

$$Ps5\text{-}7 = H5 \lor (G6+T6G7') \lor (T7'+G7'H6) \quad (5.1a)$$

$$Ps2\text{-}4 = H2 \lor (G3+T3G4') \lor ((T4'+G4'H3')(G5\text{-}7+T5\text{-}7)+T4 \,(G5\text{-}7'T5\text{-}7')) \quad (5.2a)$$

$$Ps0\text{-}1 = H0 \lor (T1(G2\text{-}7'T2\text{-}7')+G1'(G2\text{-}7+T2\text{-}7')) \quad (5.3a)$$

For Cin=0

$$Ps5\text{-}7 = H5 \lor (G6+T6G7') \lor T7 \quad (5.4a)$$

$$Ps2\text{-}4 = H2 \lor (G3+T3G4') \lor ((T4'+G4'H3')G5\text{-}7+T4G5\text{-}7') \quad (5.5a)$$
$$Ps0\text{-}1 = H0 \lor (T1G2\text{-}7'+G1G2\text{-}7) \quad (5.6a)$$

These equations reduce to:
$$Ps5\text{-}7 = H5 \lor (T6'G7'+G6'H7+G6G7)$$
$$Ps2\text{-}4 = H2 \lor (G3+T3G4') \lor ((T4'+G4'H3')(G5\text{-}7+T5\text{-}7)+T4(G5\text{-}7'T5\text{-}7'))$$
$$Ps0\text{-}1 = H0 \lor (T1(G2\text{-}7'T2\text{-}7)+G1'(G2\text{-}7+T2\text{-}7))$$

For Cin=0

$$Ps5\text{-}7 = H5 \lor (T6'T7+T6T7'+G6'G7) \quad (5.4b)$$

$$Ps2\text{-}4 = H2 \lor (G3+T3G4') \lor ((T4'+G4'H3')G5\text{-}7+T4G5\text{-}7') \quad (5.5b)$$

$$Ps0\text{-}1 = H0 \lor (T1G2\text{-}7'+G1'G2\text{-}7) \quad (5.6b)$$

Figure 4:
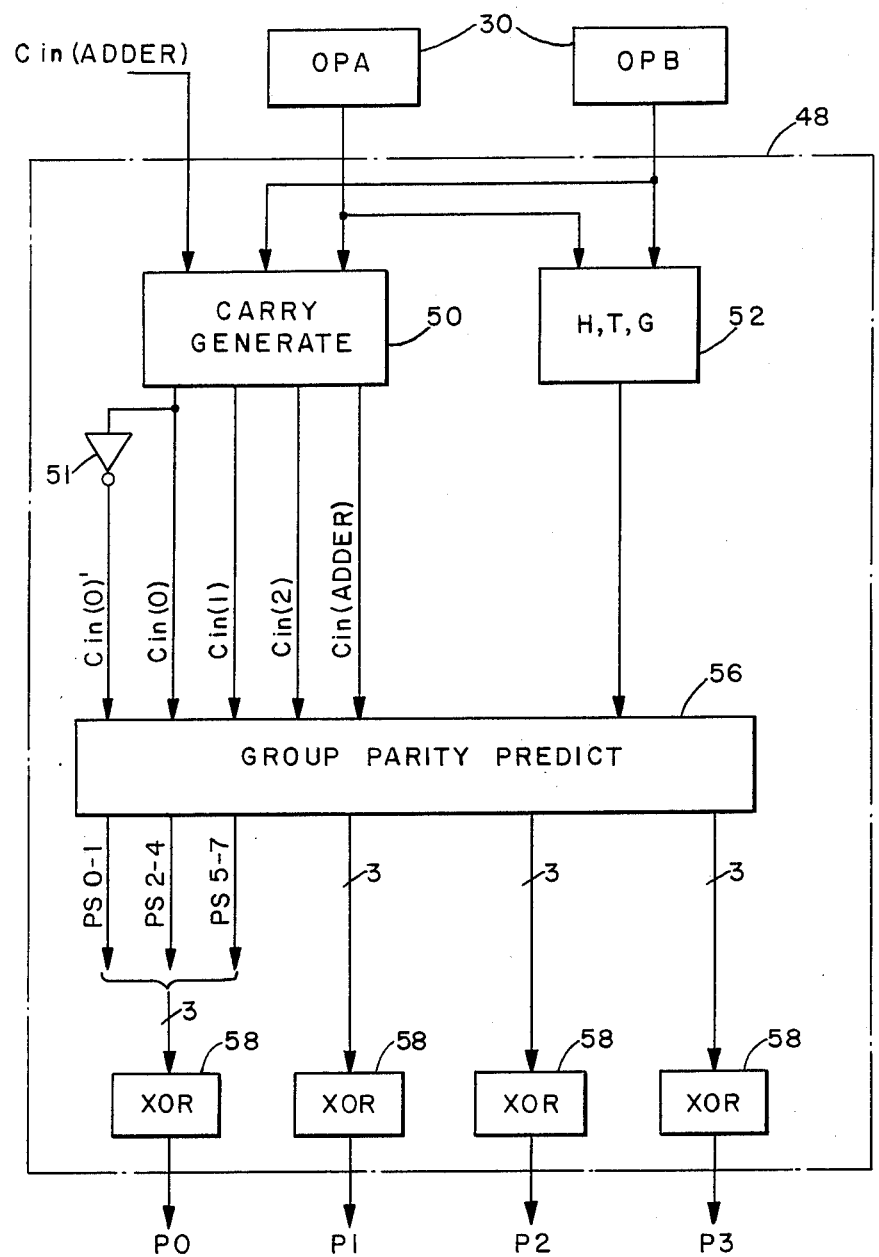
FIG. 4 is a block diagram illustrating the parity prediction of the invention.

The industrial application of the invention is implemented as illustrated in FIGS. 4–14. In FIG. 4, the parity predict circuit of the invention includes a carry generate circuit 50, an intermediate term generation circuit 52 for generating half-sum (H), transmit (T), and generate (G) terms, a group parity predict generating circuit 56, and a plurality of three-input exclusive-OR (XOR) circuits 58.

The carry generate circuit 50 is conventional in all respects and provides a means for generating byte carry-in signals Cin. The byte carry-in signals are conventional, and conventionally derived from the Cin(adder) bit, and the bits comprising operand A and operand B. A group carry-in signal represents the signal which would be generated as a carry from one sum byte to the next adjacent sum byte of higher magnitude. For example, the Cin(adder) signal represents the carry into the circuitry for generating the lowest magnitude sum bits. In this regard, the Cin(adder) signal is carried into the CLA to be combined with the lowest magnitude bits of operands A and B to generate sum byte S (3). The carry-in signal Cin (2) is the carry-out signal generated by the production of the lowest magnitude sum byte and carried into the generation of sum byte S (2). The carry-in signals Cin (1) and (0) similarly are the signals carried in to generate sum bytes (S1) and (S0), respectively. Any of the Cin signals produced by the carry generate circuit 50 corresponds to the Cin term of equations (5.1)–(5.6) and equations (5.1a)–(5.6b). Generation of the complement of each Cin signal is conventional. In FIG. 4, the complement of Cin (0), that is, Cin (0)', is generated through the inverter 51. Although not shown in FIG. 4, it is understood that the complements of the other Cin signals are similarly generated.

Figure 5:
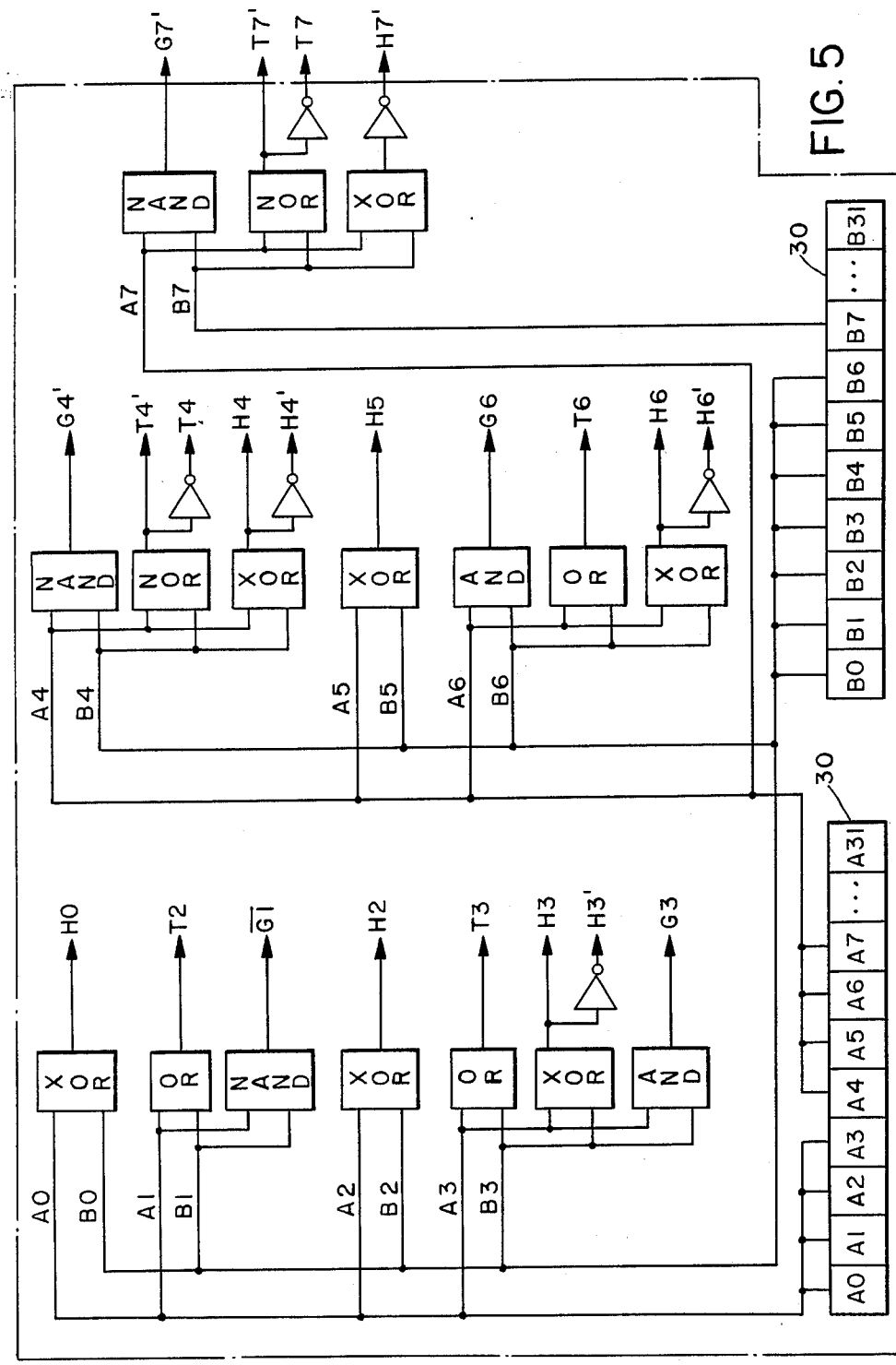
FIGS. 5, 6, and 7 are logic diagrams illustrating circuits for producing half-sum, generate, and transmit terms used by the apparatus of the invention.
Figure 6:
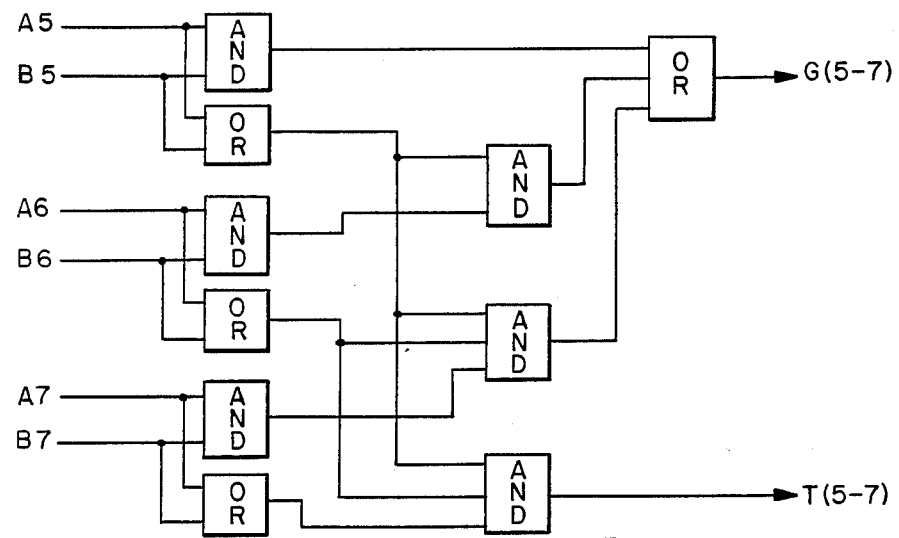
Figure 7:
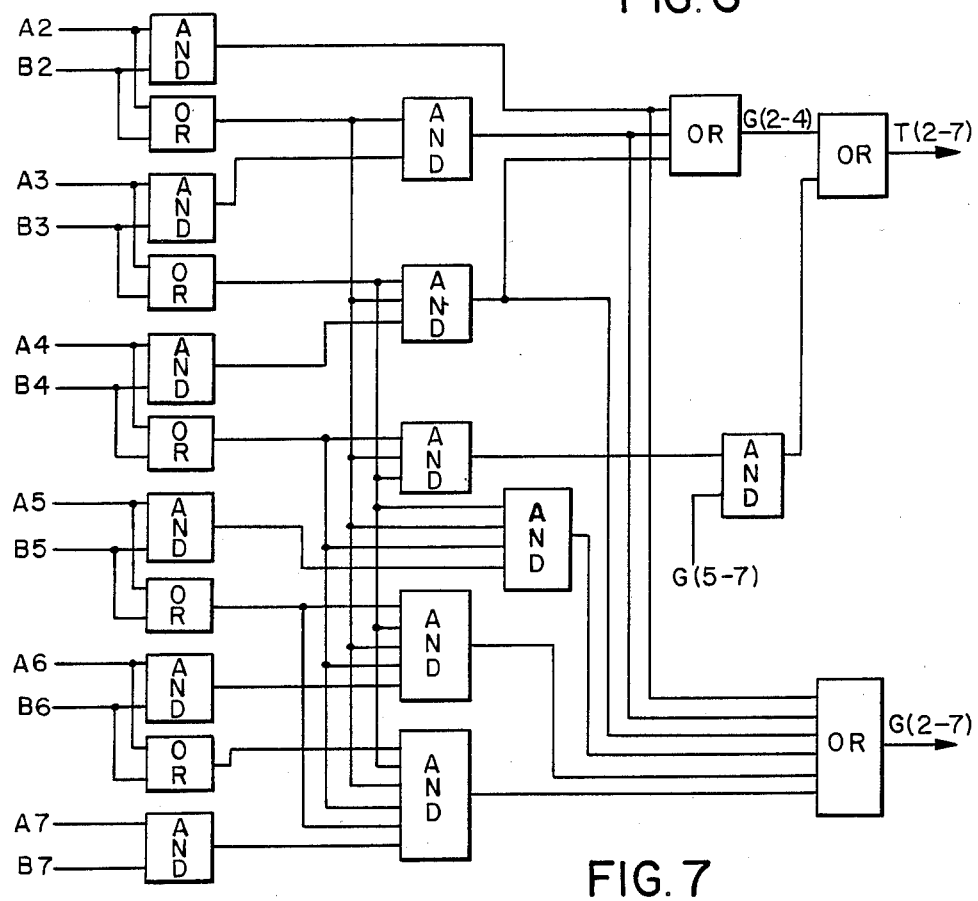

In FIG. 5, the half sum (H), transmit (T), and generate (G) signals for calculating the parity bits of the first sum byte (S0) are generated by respective circuit combinations including exclusive-OR (XOR), (OR), (NAND), and (NOR) gates according to the equivalencies (1.4)–(1.6). As FIG. 5 illustrates, these terms are generated from the most significant eight bits of operand A and operand B. FIGS. 6 and 7 illustrate group generate and transmit signals G(5–7), T(5–7), G(2–7), and T(2–7) according to conventional combinations of AND and OR gates. These terms are conventional, and are well described in the Langdon et al reference at page 2. The circuits of FIGS. 5–7 (with the exception of the operand register 30) are included in the intermediate term generation circuit 52. It is understood that corresponding circuitry exists for generation of corresponding half-sum, transmit, and generate terms for sum bytes S(1)–S(3), although these are not illustrated in FIGS. 5–7.

The group parity predict circuit 56 receives the Cin signals, together with their complements, from the carry generate circuit 50 and combines them with the intermediate term signals generated by the circuit 52 produced the group parity predict bits necessary to calculate the predicted parity bits P0–P3 for the sum bytes S(0)–S(3), respectively. In the description which follows, the portion of the group parity predict circuit 56 which calculates the group parity bits necessary to produce parity bit P0 are described, it being understood that the explanation provides an enabling teaching regarding calculation of parity group bits for each of the other parity bits.

In calculating parity bit P0 for sum byte S(0), three group parity bits PS0–1, PS2–4, and PS5–7, must be calculated according to one of the two sets of equations (5.1)–(5.3) or (5.4)–(5.6) derived and explained above.

Figure 8:
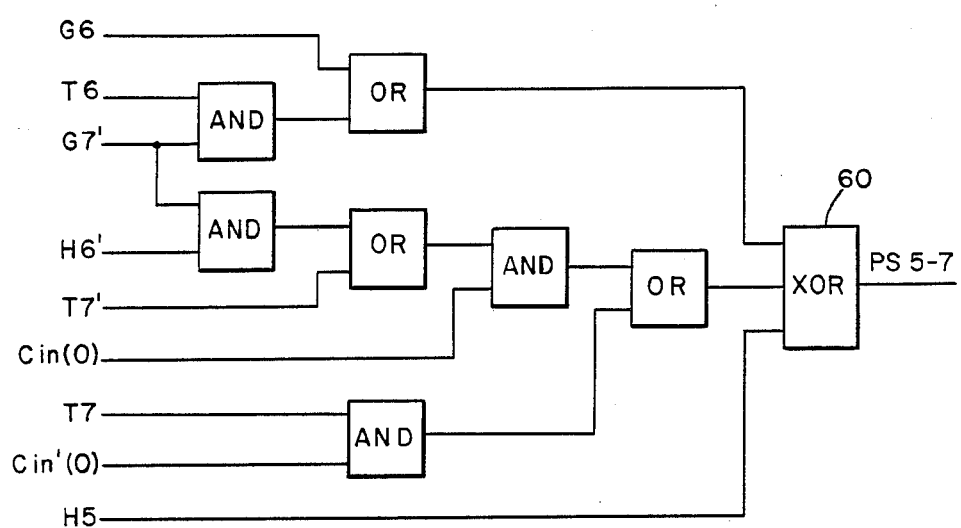
FIGS. 8-10 are logic diagrams, each showing the calculation of the parity of one portion of a sum byte according to a first method.
Figure 9:
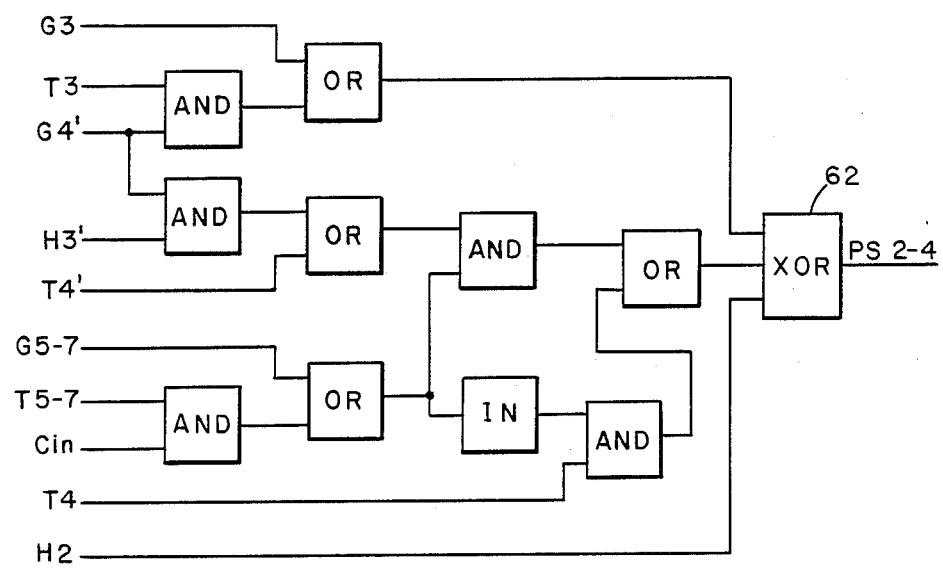
Figure 10:
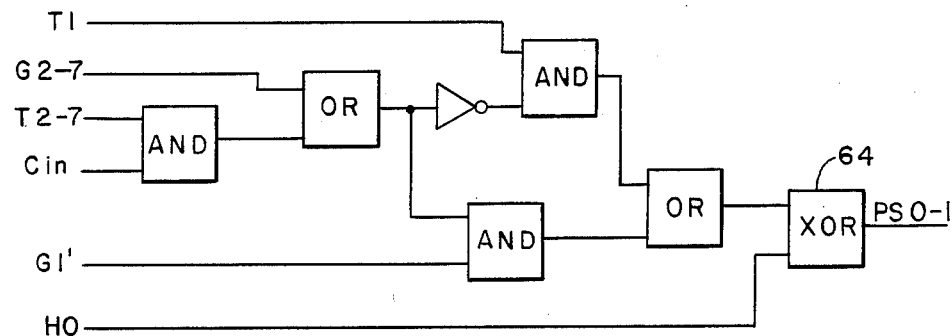
Figure 14:
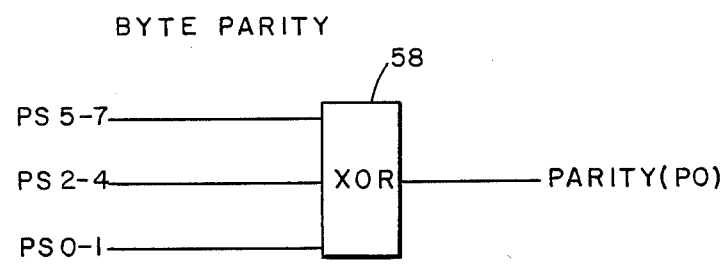
FIG. 14 is a logic diagram showing the combination of the parity bits for partial bytes to calculate a parity bit or a sum byte.

For calculation of these group parity bits according to method 1, refer to FIGS. 8–10. FIG. 8 illustrates a combinatorial logic circuit for calculating group parity bit Ps5–7 according to equation (5.1). In FIG. 8, an XOR gate 60 collects the three terms of the equation (5.1) which are XORed together. The parameters for the three terms include the C(0) signal and its complement provided by the carry generate circuit 50, and half-sum, group carry and transmit signals generated by the portions of the intermediate term circuit 52 illustrated in FIGS. 5–7. Similarly, the group parity bit Ps2–4 is calculated by the circuit of FIG. 9, which implements equation (5.2) by means of an XOR gate 62 which collects and combines the three terms of equation (5.2), which are combinations of one or more of the parameters generated by the carry generate and intermediate term circuits 50 and 52. Last, FIG. 10 is a circuit illustrating the embodiment of equation (5.3), which calculates group parity bit Ps0–1 at the output of the XOR gate 64, which collects the two terms of the equation. Finally, the three group parity bits Ps0–1, Ps2–4, and Ps5–7 are collected and combined by one of the three-input XOR circuits 58 to produce predicted parity bit P0 for sum byte S(0), as illustrated in FIG. 14.

Figure 11:
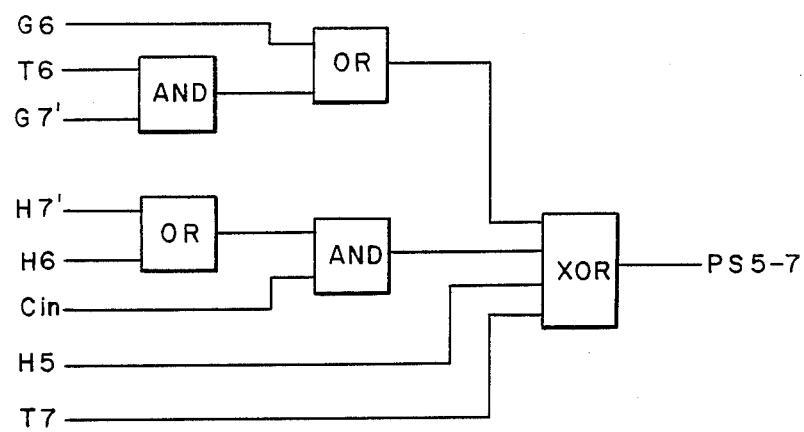
FIG. 11-13 are logic diagrams, each illustrating the calculation of parity of one portion of a sum byte according to a second method.
Figure 12:
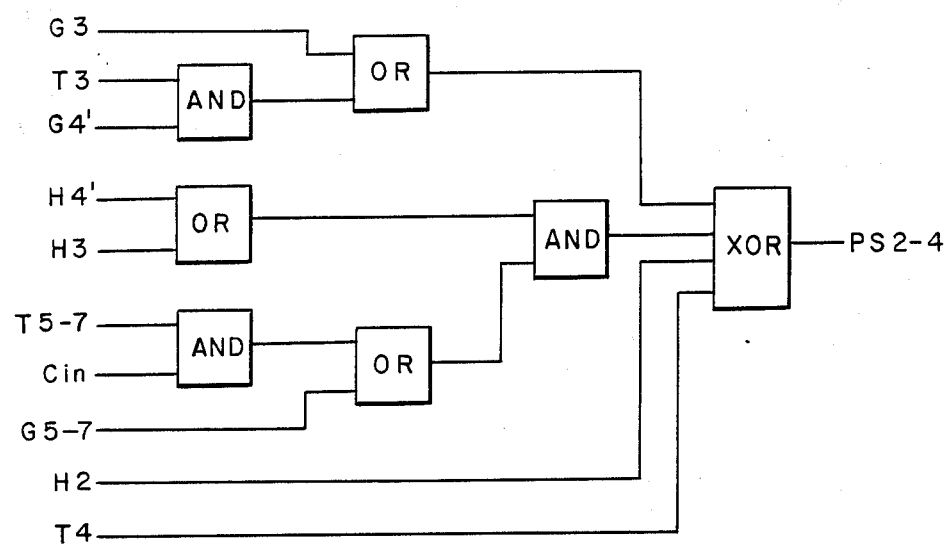
Figure 13:
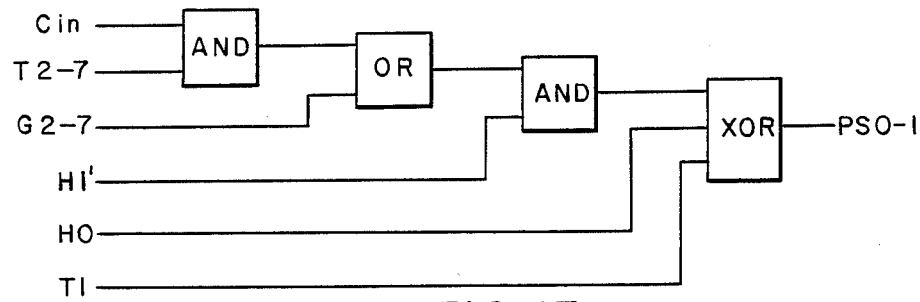

The calculation of the group parity bits according to equations (5.6)–(5.4) are illustrated by the combinatorial logic circuits of FIGS. 11–13, respectively, which utilize conventional Boolean functions to combine signals from the carry-generate and intermediate product circuits 50 and 52 and to produce the three group parity bits according to method 2. These three bits are combined as illustrated in FIG. 14 to produce predicted parity bit P0.

APPENDIX A

. In deriving the parity prediction equations, the following notations and Boolean equivalencies will be used:

I. Notations
(1) ′ is the logical inverse of an expression
(2) (a+b) is the logical OR of "a" and "b"
(3) (ab) is the logical AND of "a" and
(4) V is an exclusive-OR (XOR)
(5) Ti is the carry transmit of bit i
(6) Gi is the carry generate of bit i
(7) Hi is the half sum of bit i
(8) Tx-y is the carry transmit signal from bit x to bit y
(9) Gx-y is the carry generate signal from bit x to bit y
(10) Pcx-y is the parity of the carries from bit x to bit y
(11) Psx-7 is the parity of the sum from bit x to bit y
(12) 0 is the most significant bit II. Boolean Equivalencies
(1.1) $1 \vee a = a'$
(1.2) $a+b = a \vee b \vee ab$
(1.3) $a+a'b = a+b$
(1.4) $T_i = (a_i + b_i)$
(1.5) $G_i = (a_i b_i)$
(1.6) $H_i = (a_i \vee b_i) = T_i G_i'$

We claim:
1. In a data processing system including an adder for adding binary data operands A and B and a carry-in signal to produce a multibit result output signal representing the sum S of said operands in the form of a plurality of sequential eight-bit sum bytes, the improvement comprising;

a parity prediction circuit connected to receive said operands and said carry-in signal for determining the parity of each of three sequential bit groups, s0s1, s2s3s4, and s5s6s7, in a sum byte, Sj, and for producing three group parity signals, Ps0-1, Ps2-4, and Ps5-7, respectively indicating the parities of said bit groups, where si denotes a bit at significance location i in said sum byte sj; and an exclusive-OR circuit for combining said group parity signals to produce a signal P indicative of parity for said sum byte according to:

$$P = Ps0\text{-}1 \vee Ps2\text{-}4 \vee Ps5\text{-}7$$

where V is the logical exclusive-OR operation.

2. The improvement of claim 1, wherein said parity prediction circuit includes means for producing said group parity signals according to:

$$Ps0\text{-}1 = Pa0\text{-}1 \vee Pb0\text{-}1 \vee Pc0\text{-}1$$
$$Ps2\text{-}4 = Pa2\text{-}4 \vee Pb2\text{-}4 \vee Pc2\text{-}4$$
$$Ps5\text{-}7 = Pa5\text{-}7 \vee Pb5\text{-}7 \vee Pc5\text{-}7$$

where:
Pa(i−i+n) is the parity over bits ai through a(i+n) in byte Aj of operand A;
Pb(i−i+n) is the parity over bits b(i) through b(i+n) in byte Bj of operand B; and
Pc(i−i+n) is the parity of carry-ins for said bit groups.

3. The improvement of claim 2, wherein said parity prediction circuit includes means for producing said group parity signals according to:

$$Ps0\text{-}1 = H0 \vee T1(G2\text{-}7 + T2\text{-}7Cin)' + G1'(G2\text{-}7 + T2\text{-}7Cin))$$

$$Ps2\text{-}4 = H2 \vee (G3 + T3G4') \vee ((T4' + G4'H3') (G5\text{-}7 + T5\text{-}7Cin) + T4(G5\text{-}7 + T5\text{-}7Cin)')$$

$$Ps5\text{-}7 = H5 \vee (G6 + T6G7') \vee ((T7' + G7'H6')Cin + T7Cin')$$

where:
ai is the ith bit of byte Aj,
bi is the ith bit of byte Bj,
$T_i = (a_i + b_i)$,
$G_i = (a_i \vee b_i)$,
Cin is the carry into said sum byte,
Tx-y is the group carry transmit signal from bit x to bit y,
Gx-y is the group carry generate signal from bit x to bity y,
+ is the logical OR operation, and
(ab) is the logical AND of a and b.

4. The improvement of claim 2, wherein said parity prediction circuit includes means for producing said group parity signals according to:

$$Ps0\text{-}1 = T1 \vee H0 \vee (G2\text{-}7 + T2\text{-}7Cin)H1'$$

$$Ps2\text{-}4 = H2 \vee T4 \vee (G3 + T3G4') \vee ((G5\text{-}7 + T5\text{-}7Cin)(H4' + H3))$$

$$Ps5\text{-}7 = H5 \vee T7 \vee (G6 + T6G7') \vee Cin(H7' + H6)$$

where:
ai is the ith bit of byte Aj,
bi is the ith bit of byte Bj,
$T_i = (a_i + b_i)$,
$G_i = (a_i \vee b_i)$,
Cin is the carry into said sum byte,
Tx-y is the group carry transmit signal from bit x to bit y,
Gx-y is the group carry generate signal from bit x to bity y,
+ is the logical OR operation, and
(ab) is the logical AND of a and b.

* * * * *

UNITED STATES PATENT AND TRADEMARK OFFICE
CERTIFICATE OF CORRECTION

PATENT NO. : 4,924,423
DATED : May 8, 1990
INVENTOR(S) : Vassiliadis et al

It is certified that error appears in the above-identified patent and that said Letters Patent is hereby corrected as shown below:

Column 13, line 56, please delete the "s"

Signed and Sealed this

Eleventh Day of June, 1991

*Attest:*

HARRY F. MANBECK, JR.

*Attesting Officer*     *Commissioner of Patents and Trademarks*